US012050150B2

(12) United States Patent
Leclerc

(10) Patent No.: US 12,050,150 B2
(45) Date of Patent: Jul. 30, 2024

(54) SPECTRAL AVERAGING OF OTDR TRACES

(71) Applicant: EXFO Inc., Québec (CA)

(72) Inventor: Michel Leclerc, Québec (CA)

(73) Assignee: EXFO Inc., Quebec (CA)

(*) Notice: Subject to any disclaimer, the term of this patent is extended or adjusted under 35 U.S.C. 154(b) by 183 days.

(21) Appl. No.: 17/738,295

(22) Filed: May 6, 2022

(65) Prior Publication Data

US 2022/0390321 A1 Dec. 8, 2022

Related U.S. Application Data

(60) Provisional application No. 63/269,993, filed on Mar. 28, 2022, provisional application No. 63/196,977, filed on Jun. 4, 2021.

(51) Int. Cl.
*G01M 11/00* (2006.01)
*H04B 10/071* (2013.01)
*H04B 10/2513* (2013.01)

(52) U.S. Cl.
CPC .... *G01M 11/3127* (2013.01); *G01M 11/3145* (2013.01); *H04B 10/071* (2013.01); *H04B 10/2513* (2013.01)

(58) Field of Classification Search
CPC ............. G01M 11/31; G01M 11/3109; G01M 11/3118; G01M 11/3127; G01M 11/3136; G01M 11/3145; G01M 11/3154; G01M 11/3163; G01M 11/3181; G01M 11/319; H04B 10/07; H04B 10/071; H04B 10/073; H04B 10/0731; H04B 10/075; H04B 10/077; H04B 10/0773; H04B 10/0755; H04B 10/079; H04B 10/0791; H04B 10/0793; H04B 10/0795; H04B 10/07951; H04B 10/2507; H04B 10/25073;
(Continued)

(56) References Cited

U.S. PATENT DOCUMENTS 5,179,420 A * 1/1993 So ................... G01M 11/3127
356/73.1
5,956,131 A * 9/1999 Mamyshev ........ G01M 11/3163
356/73.1
(Continued)

FOREIGN PATENT DOCUMENTS

EP 1746403 A1 1/2007

OTHER PUBLICATIONS

Duwayne R. Anderson; Florian G. Bell; Larry Johnson: "Troubleshooting Optical Fiber Networks; Understanding and Using Your Optical Time-Domain Reflectometer", second edition, 2004, Elsevier, XP040425629, ISBN: 978-0-12-058661-5 DOI: https://doi.org/10.1016/B978-0-12-058661-5 X5020-4.
(Continued)

*Primary Examiner* — Gordon J Stock, Jr.
(74) *Attorney, Agent, or Firm* — Helene Chotard

(57) ABSTRACT

There is provided a technique to reduce the Rayleigh coherence noise in OTDR measurements using spectral averaging of OTDR traces while at least partly cancelling chromatic dispersion pulse broadening on the averaged OTDR trace by applying a chromatic dispersion correction prior to averaging the OTDR traces. By correcting for chromatic dispersion pulse broadening, it allows to reduce the Rayleigh coherence noise without impacting the OTDR spatial resolution.

21 Claims, 10 Drawing Sheets

(58) Field of Classification Search
CPC .......... H04B 10/25077; H04B 10/2513; H04B 10/25133; H04B 10/25137; H04B 10/2519; H04B 10/2525; H04B 10/25253; H04B 10/2531; H04B 10/2537; H04B 10/2543; H04B 10/255; H04B 10/2557; H04B 10/2563
USPC ...................................................... 356/73.1
See application file for complete search history.

(56) References Cited

U.S. PATENT DOCUMENTS

| | | | | |
|---|---|---|---|---|
| 6,011,615 | A * | 1/2000 | Mamyshev | G02B 6/02247 356/73.1 |
| 6,580,500 | B2 * | 6/2003 | Aoki | G01M 11/3127 356/73.1 |
| 6,614,512 | B1 * | 9/2003 | Sakamoto | G01M 11/3163 356/73.1 |
| 6,882,410 | B2 * | 4/2005 | Asahina | G01M 11/3163 356/73.1 |
| 7,020,360 | B2 * | 3/2006 | Satomura | G01M 11/3172 356/73.1 |
| 7,221,439 | B2 * | 5/2007 | Chen | G01M 11/3163 356/73.1 |
| 9,885,633 | B2 | 2/2018 | Lally et al. | |
| 10,014,935 | B2 * | 7/2018 | Perron | H04B 10/071 |
| 11,044,019 | B2 * | 6/2021 | Qiao | H04B 10/25133 |
| 2004/0208523 | A1 | 10/2004 | Carrick et al. | |
| 2011/0293290 | A1 * | 12/2011 | Gholami | G02B 6/0288 356/73.1 |
| 2021/0404909 | A1 | 12/2021 | Leclerc et al. | |
| 2022/0128434 | A1 | 4/2022 | Perron et al. | |

OTHER PUBLICATIONS

Gysel et al., "Statistical Properties of Rayleigh Backscattering in Single-Mode Fibers," Journal of Lightwave Technology. vol. 8, No. 4. Apr. 1990, pp. 561-567.
K De Souza, "Significance of coherent Rayleigh noise in fibre-optic distributed temperature sensing based on spontaneous Brillouin scattering," Institute of Physics Publishing Measurement Science and Technology, Meas. Sci. Technol. 17 (2006), pp. 1065-1069.
D. Villafani Caballero et al., "Tuneable OTDR Measurements for WDM-PON Monitoring," ResearchGate, Conference Paper Aug. 2013, 6 Pages.
Corning Incorporated, "Corning SMF-28e Optical Fiber Product Information," Issued Jan. 2005, ISO 9001 Registered PI1344, 4 Pages.

* cited by examiner

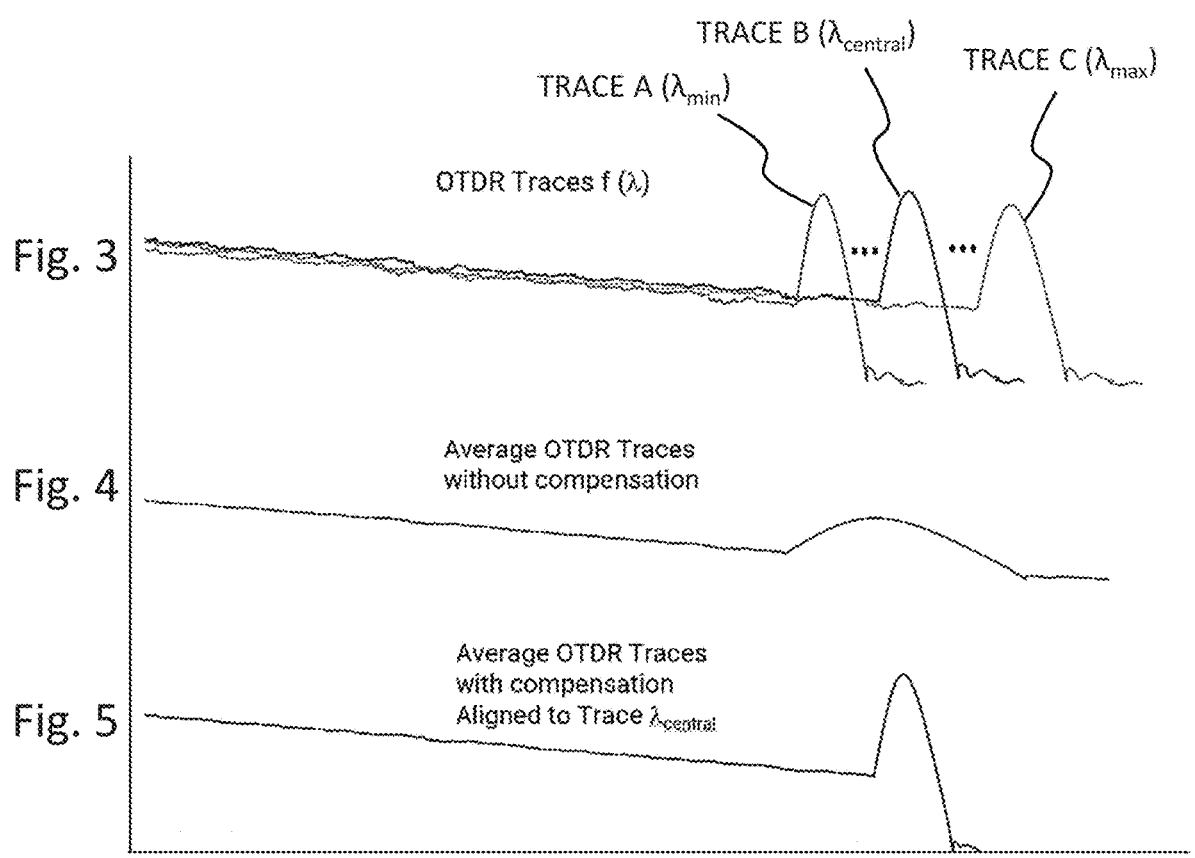

SPECTRAL AVERAGING OF OTDR TRACES

TECHNICAL FIELD

The present description generally relates to Optical Time Domain Reflectometry (OTDR), and more particularly to reducing Rayleigh backscattering noise on OTDR measurements.

BACKGROUND

Optical Time-Domain Reflectometry (OTDR—also used to refer to the corresponding device) is widely employed for characterization of optical fiber links. OTDR is a diagnostic technique where light pulses are launched in an optical fiber link and returning light, arising from backscattering and reflections along the fiber link, is detected and analyzed. Various "events" along the fiber link can be detected and characterized through a proper analysis of the returning light in the time domain and insertion loss of the fiber link under test, as well as each component along the link, can be characterized.

The manufacturing process of optical fibers produces small fluctuations in the optical fiber structure along any segment of optical fiber. When such fluctuations interact with the OTDR test pulses, it creates interferences and modulations that produce a Rayleigh backscattering noise in the acquired OTDR trace (also referred to elsewhere as "coherent backscattering noise"). The presence of such phenomenon is typically regarded as noise that should be eliminated in OTDR traces because in can hide some discrete events of small insertion loss and/or reflectance. Conventional OTDRs are thus designed to try to minimize the amplitude of this Rayleigh backscattering noise. For example, it is known is the art to use spectral averaging to smooth the Rayleigh backscattering noise on OTDR acquisition traces. Spectral averaging can be achieved by employing a larger linewidth OTDR laser source for the OTDR acquisition. Another approach is to use a tunable laser as a mean of spectrally smoothing the OTDR trace.

It was found that to obtain low Rayleigh backscattering noise levels, the laser source shall be very wide. But the widest the source, the more it is subject to chromatic dispersion pulse spreading, which negatively impacts the OTDR spatial resolution. Similarly, when OTDR traces are acquired and averaged over a wide tuning range in order to obtain a substantial spectral averaging, such a wide effective linewidth also deforms the OTDR trace due to chromatic dispersion.

There therefore remains a need for a technique to reduce the Rayleigh backscattering noise on OTDR measurements.

SUMMARY

There is provided a technique to reduce the Rayleigh backscattering noise on OTDR measurements using spectral averaging of OTDR traces while at least partly cancelling chromatic dispersion pulse broadening on the averaged OTDR trace by applying a chromatic dispersion correction prior to averaging the OTDR traces. By correcting for chromatic dispersion pulse broadening, it allows to reduce the Rayleigh backscattering noise without impacting the OTDR spatial resolution.

In accordance with one aspect, there is provided a method for characterizing an optical fiber link under test, the method comprising:

performing a plurality of OTDR acquisitions toward the optical fiber link under test,
  wherein each OTDR acquisition is performed by propagating a pulsed test signal in the optical fiber link under test and detecting corresponding return light from the optical fiber link so as to obtain an OTDR trace representative of backscattered and reflected light as a function of distance in the optical fiber link under test, and
  wherein said plurality of OTDR acquisitions are performed with mutually-different center wavelengths of said pulsed test signal;
applying a chromatic dispersion correction on each of the plurality of OTDR traces to produce modified OTDR traces; and
averaging said modified OTDR traces to obtain a spectrally averaged OTDR trace.

In accordance with another aspect, there is provided an OTDR system for characterizing an optical fiber link under test, the OTDR system comprising:
a tunable OTDR acquisition device connectable toward an end of the optical fiber link under test for performing a plurality of OTDR acquisitions toward the optical fiber link,
  wherein each OTDR acquisition is performed by propagating a pulsed test signal in the optical fiber link under test and detecting corresponding return light from the optical fiber link so as to obtain an OTDR trace representative of backscattered and reflected light as a function of distance in the optical fiber link under test; and
  wherein OTDR acquisition device comprises a laser source tunable to perform said plurality of OTDR acquisitions with mutually-different center wavelengths of said pulsed test signal;
a processing unit connected to the tunable OTDR acquisition device to receive the OTDR traces and configured for:
  processing each of said plurality of OTDR acquisitions by applying a chromatic dispersion correction to produce corrected OTDR acquisitions; and
  averaging said corrected OTDR acquisitions to obtain a spectral averaged OTDR trace.

In accordance with another aspect, there is provided a non-transitory computer-readable storage medium comprising instructions that, when executed, cause a processor to perform the steps of:
receiving a plurality of OTDR acquisitions performed toward an optical fiber link under test,
  wherein each OTDR acquisition is performed by propagating a pulsed test signal in the optical fiber link under test and detecting corresponding return light from the optical fiber link so as to obtain an OTDR trace representative of backscattered and reflected light as a function of distance in the optical fiber link under test, and
  wherein said plurality of OTDR acquisitions are performed with mutually-different center wavelengths of said pulsed test signal;
applying a chromatic dispersion correction on each of the plurality of OTDR traces to produce modified OTDR traces; and
averaging said modified OTDR traces to obtain a spectrally averaged OTDR trace.

In some embodiments, center wavelengths of said plurality of OTDR acquisitions are uniformly distributed over a bandwidth to be covered. In some further embodiments, center wavelengths of said plurality of OTDR acquisitions are uniformly distributed over a tuning range of said pulsed test signal.

In some embodiments, the spacing between said center wavelengths is approximately equal to the linewidth of said pulsed test signal.

In some embodiments, for each acquired OTDR trace, a peak position associated with a reflective peak that is found to be present on each acquired OTDR trace is calculated In some embodiments, said applying a chromatic dispersion correction comprises: for each of said plurality of OTDR traces, calculating a stretching factor to be applied on the sampling scale of the OTDR trace, to account for chromatic dispersion; and resampling the OTDR trace to a reference sampling scale according to the stretching factor to provide a modified OTDR trace.

In some embodiments, for each OTDR trace, the stretching factor is determined from the position of a selected reflective peak in the acquired OTDR trace and in a reference OTDR trace. In some other embodiments, for each OTDR trace, the stretching factor is determined based on a center wavelength associated with the OTDR trace and with a reference OTDR trace, and typical values of chromatic dispersion corresponding to said center wavelengths.

In some embodiments, each of said plurality of OTDR acquisitions is performed while the pulsed test signal is swept in wavelength, the center wavelength of each OTDR acquisition corresponding to the center of the subband swept in wavelength. In some other embodiments, each of said plurality of OTDR acquisitions is performed while the pulsed test signal is fixed in wavelength In accordance with another aspect, there is provided a computer program comprising instructions that, when executed by a processor, cause the processor to perform any one of the methods described herein.

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context its intended application.

Further features and advantages of the present invention will become apparent to those of ordinary skill in the art upon reading of the following description, taken in conjunction with the appended drawings.

BRIEF DESCRIPTION OF THE DRAWINGS

FIG. 3 is a graph showing OTDR traces acquired with different central wavelengths of the laser source, which illustrates the spatial offset on a reflective event, caused by chromatic dispersion.

FIG. 4 is a graph showing a spectrally averaged trace obtained by averaging the OTDR traces without using chromatic dispersion correction.

FIG. 5 is a graph showing a spectrally averaged trace obtained by averaging the OTDR traces while using chromatic dispersion correction.

Figure 1:
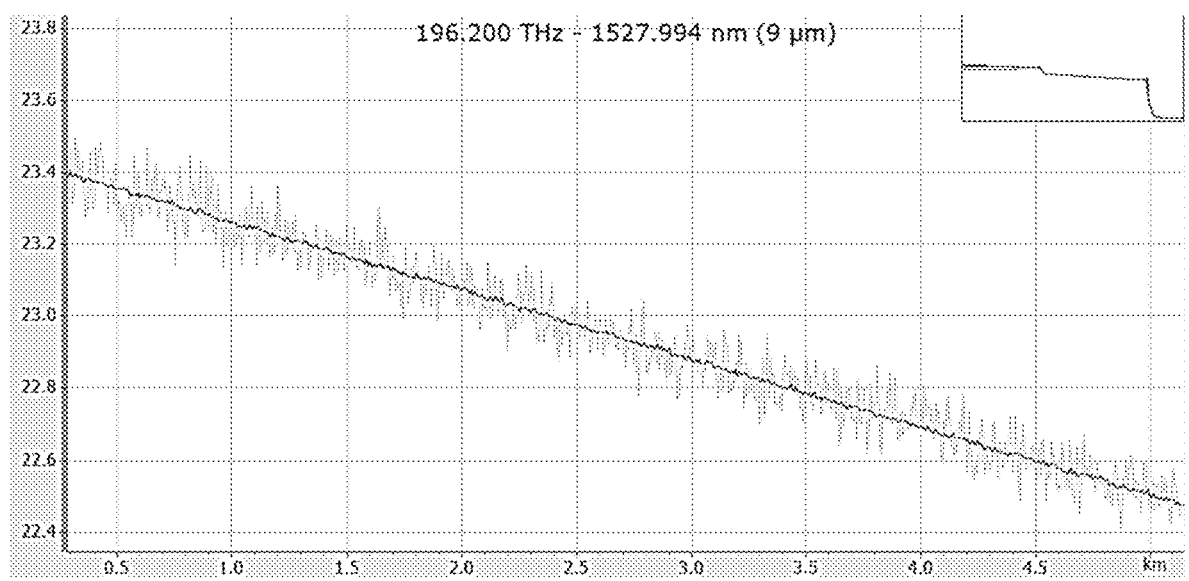
FIG. 1 is a graph illustrating how spectral averaging can be used to reduce the Rayleigh backscattering noise, wherein the OTDR trace shown in grey was obtained without spectral averaging and the trace shown in black is a spectrally averaged trace.

It will be noted that throughout the drawings, like features are identified by like reference numerals. In the following description, similar features in the drawings have been given similar reference numerals and, to not unduly encumber the figures, some elements may not be indicated on some figures if they were already identified in a preceding figure. It should be understood herein that elements of the drawings are not necessarily depicted to scale, since emphasis is placed upon clearly illustrating the elements and structures of the present embodiments. Some mechanical or other physical components may also be omitted in order to not encumber the figures.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments.

DETAILED DESCRIPTION

OTDR is a diagnostic technique for optical fiber links where a test signal in the form of light pulses is launched in the optical fiber link under test and the return light signal, arising from backscattering and reflections along the link, is detected. Herein, the process of launching a test signal and acquiring the return light signal to obtain therefrom an OTDR trace is referred to as an "OTDR acquisition". The acquired power level of the return light signal as a function of time is referred to as an "OTDR trace" or a "reflectometric trace", where the time scale is representative of distance between the OTDR acquisition device and a point along the fiber link. Light acquisitions may be repeated with varied pulse width values to produce a separate OTDR trace for each test pulse width.

Although an OTDR trace is typically referred to as a function representing backscattered and reflected light as a function of "distance" in the optical fiber link under test, what is actually measured during an OTDR acquisition is the return light as a function of "time". OTDR data is therefore sampled on the time scale, with a fixed sampling period $\Delta t$ determined by the sampling circuit. In the present description, the sampled OTDR data is represented in a one-dimensional array wherein $Trace_n(i)$ represents the sampled OTDR trace value data at index i and wherein the time scale can be retrieved as $i \times \Delta t$. Of course, other representations may be envisaged without departing from the invention.

One skilled in the art will readily understand that in the context of OTDR methods and systems, each light acquisition generally involves propagating a large number of substantially identical light pulses in the optical fiber link and averaging the results. In this case, the result obtained from averaging will herein be referred to as an OTDR trace. It will also be understood that other factors may need to be controlled during the light acquisitions or from one light acquisition to the next, such as gain settings, pulse power, etc. as is well known to those skilled in the art.

"Backscattering" refers to Rayleigh scattering occurring from the interaction of the travelling light with the optical fiber media all along the fiber link, resulting in a generally sloped background light (in logarithmic units, i.e. dB, on the ordinate) on the OTDR trace, whose intensity disappears at the end of the range of the travelling pulse. "Events" along the fiber will generally result in a more localized drop of the backscattered light on the OTDR trace, which is attributable to a localized loss, and/or in a localized reflection peak. It will be understood that an "event" characterized by the OTDR method described herein may be generated by any perturbation along the fiber link which affects the returning light. Typically, an event may be generated by an optical fiber splice along the fiber link, which is characterized by a localized loss with little or no reflection. Mating connectors can also generate events that typically present reflectance, although these may be impossible to detect in some instances. OTDR methods and systems may also provide for the identification of events such as a fiber breakage, characterized by substantial localized loss and, frequently, a concomitant reflection peak, as well as loss resulting from a bend in the fiber. Finally, any other component along the fiber link may also be manifest as an "event" generating localized loss.

The manufacturing process of optical fibers produces small fluctuations in the optical fiber structure along any segment of optical fiber. When such fluctuations interact with the OTDR test pulses, it creates interferences and modulations that produce a Rayleigh backscattering noise in the acquired OTDR trace.

The backscattered light may be described as the coherent superposition of the light generated by many weak reflectors, randomly spread in the fiber. Each of these reflectors can be described by means of Rayleigh's theory, according to which the backscattered light is in phase with the incident one and has the same polarization. However, the intensity of the light reflected by the single scattering center is a random quantity, because so are density fluctuations.

The complex envelope, b(t), of the backscattered light in a single mode fiber can be described by the following expression:

$$b(t) = \sum_n c_n e^{-2[\alpha(z_n)+j\beta z_n]} a(t - 2\tau_n), \qquad (1)$$

where $\beta$ is the propagation constant of the fiber, $\alpha(z)$ describes the attenuation accumulated up to z, $c_n$ and $z_n$ are the random amplitude and position of the nth scattering center, $T_n$ is the group delay introduced by the propagation up to $z_n$, the factor 2 takes in to account roundtrip propagation, and a(t) is the complex envelope of the test signal used to probe the fiber (see P. Gysel and R. K. Staubli, "Statistical properties of Rayleigh backscattering in single-mode fibers," in *Journal of Lightwave Technology*, vol. 8, no. 4, pp. 561-567, April 1990).

We herein define the "Coherent Rayleigh Noise" (CNR) in the backscattered light b(t) as the noise that is inherent to Rayleigh backscattered radiation and is due to the interference among the large number of lightwaves backscattered at different positions in the fiber and thereby causing phase-intensity noise conversion. The Coherent Rayleigh Noise manifests itself during OTDR measurement, as a "coherence noise" in the measured backscattered light.

The coherence noise as measured with a conventional OTDR represents an interference pattern resulting from the combination of the optical fiber structure and the OTDR signal pulse function and spectrum. For a given fiber under test, factors which influence the amplitude of the coherence noise in an acquired OTDR trace include: the laser linewidth ($\Delta v$) and the OTDR pulse width (or OTDR pulse length $\Delta z$).

The fraction ($f_{CRN}$) of the Coherent Rayleigh Noise (CRN) (inherent to the optical fiber) which manifests in the OTDR trace as a coherence noise is defined as ratio of the standard deviation of the amplitude of the measured coherence noise to that of the CRN and is given as (see K De Souza, "Significance of coherent Rayleigh noise in fibre-optic distributed temperature sensing based on spontaneous Brillouin scattering", in *Measurement Science and Technology*, vol. 17, pp. 1065-1069, April 2006):

$$f_{CRN} \approx \left(\frac{V_g}{4\Delta z \Delta v}\right)^{1/2} \qquad (2)$$

wherein Vg is the group velocity, $\Delta z$ is the OTDR pulse length and $\Delta v$ is the laser linewidth.

This equation shows that the fraction $f_{CRN}$ of the Coherent Rayleigh Noise which manifests in the OTDR trace as a coherence noise is inversely proportional to the OTDR pulse width and the OTDR laser linewidth.

Therefore, the amplitude of the coherence noise can be reduced by increasing the OTDR pulse width. However, this reduces the spatial resolution as well, which is important in many applications.

The amplitude of the coherence noise can also be reduced by increasing the laser linewidth. The larger the laser linewidth, the lower the amplitude of the measured coherence noise. For example, using equation (2), it is found that for Vg=2×10⁸ m/s; Δz=10 m; and Δv=50 MHz, 1 GHz and 100 GHz, the fractions $f_{CRN}$ are 31.6%, 7.07% and 0.71% respectively. But the widest the source, the more it is subject to chromatic dispersion pulse spreading, which negatively impacts the OTDR spatial resolution.

Time averaging may further be used to reduce the electronic noise but this does not reduce the coherence noise.

Another approach is to use a tunable laser as a mean of spectrally smoothing the OTDR trace.

FIG. 1 illustrates how increasing the effective linewidth using spectral averaging can be used to reduce the coherence noise. It compares, in grey, an OTDR trace that was obtained without spectral averaging and, in black, the result of spectral average of OTDR traces acquired on the optical fiber. More specifically, OTDR traces are acquired for mutually-different central wavelengths of the tunable OTDR laser source. These OTDR traces are then averaged with one another to obtain an averaged OTDR trace having an increased effective linewidth.

But such spectral averaging may also be subject to chromatic dispersion pulse spreading, which negatively impacts the OTDR spatial resolution.

Figure 2:
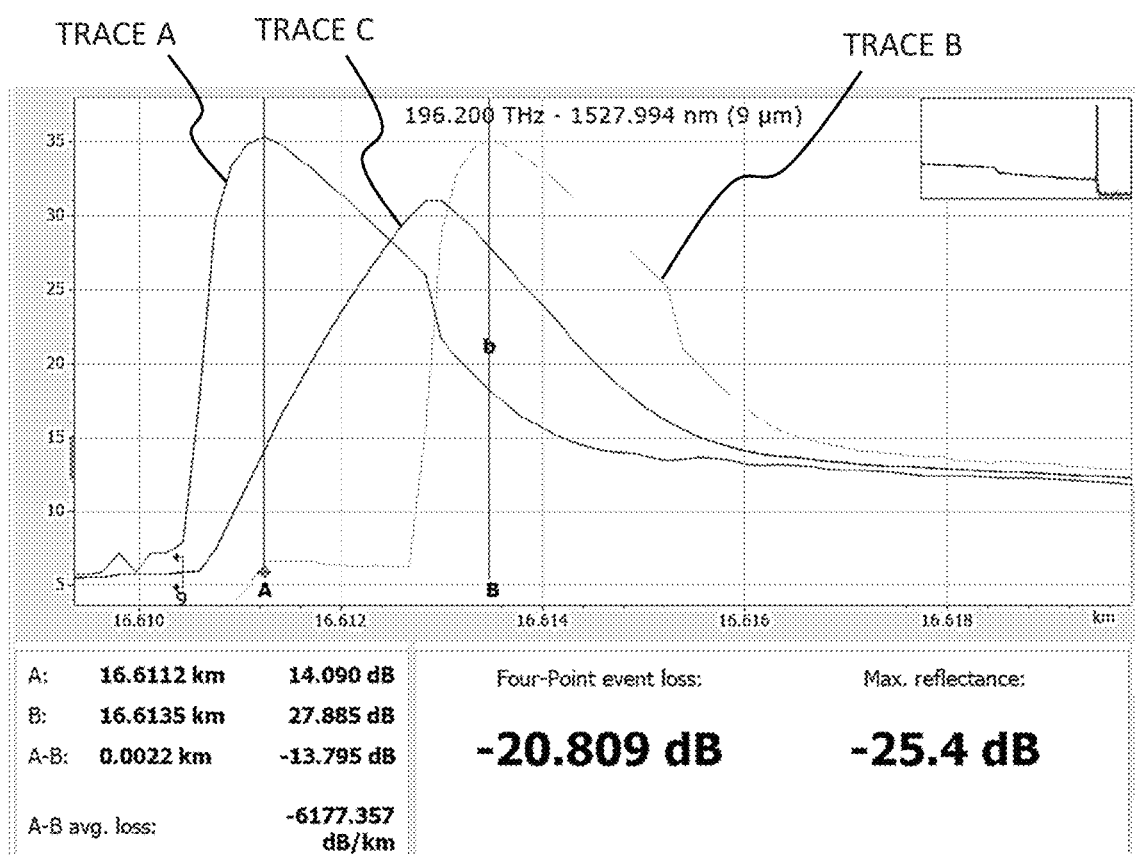
FIG. 2 is a graph illustrating the chromatic dispersion effect, wherein by zooming on a reflective event along OTDR traces, wherein OTDR traces A and B were acquired on the same optical fiber link but with different central wavelengths of the laser source and trace C was obtained using spectral averaging.

FIG. 2 illustrates the chromatic dispersion effect by zooming on a reflective event along OTDR traces. OTDR traces A and B were acquired on the same optical fiber link but with different central wavelengths of the laser source (respectively 196.2 THz and 191.2 THz, i.e., Δλ=40 nm). These traces are here shown without dispersion compensation.

The trace C was obtained using spectral averaging, in this case, by averaging 400 traces acquired between 196.2 THz and 191.2 THz (i.e., covering Δf=5 THz/Δλ=40 nm).

It can be observed that for a same event position at about 16.61 km along the tested optical fiber link, the reflectance peak does not appear at the same position on the two OTDR traces. This is due to chromatic dispersion. The distance between the peaks is about 2.2 meters. It can also be observed that reflectance peak is spatially spread on the spectrally averaged trace and therefore also show a reduced amplitude (amplitude difference of about 4 dB).

For a typical SMF-28 fiber, the chromatic dispersion coefficient $CD_{coeff}$ is 18 ps/nm/km. The expected position difference Δx on the acquired OTDR traces is given by:

$$\Delta x = CD_{coeff} \times \Delta\lambda \times D \times c/n_{eff} \quad (3)$$

wherein D is the distance of the event along the tested optical fiber link, c is the light speed in vacuum (3×10⁸ m/s) and $n_{eff}$ is the optical fiber effective refractive index (1.4679). A calculation that uses this value corroborates the experimental results for an event located at 16.61 km away from the test instrument, i.e., Δx≈2.44 m.

However, it was found that when using spectral averaging to reduce the coherence noise on OTDR measurements, the chromatic dispersion can be at least partly cancelled in processing by applying a chromatic dispersion correction on each OTDR traces prior to averaging.

FIGS. 3, 4 and 5 illustrates how this technique can be used to reduce chromatic dispersion pulse broadening on a spectrally averaged OTDR trace and may allow more accurate characterization of events, including insertion loss and reflectance characterization. FIG. 3 illustrates the spatial offset on a reflective event, which is caused by chromatic dispersion, wherein trace A is obtained for a central wavelength $\lambda_{min}$ at the minimum wavelength of the tuning range of the laser source, trace B is obtained for a central wavelength $\lambda_c$ in the middle of the tuning range and trace C is obtained for a central wavelength $\lambda_{max}$ at the maximum wavelength of the tuning range. FIG. 4 shows a spectrally averaged trace obtained by averaging the OTDR traces without using chromatic dispersion correction. It illustrates the chromatic dispersion pulse broadening on a spectrally averaged OTDR trace, without chromatic dispersion correction. FIG. 5 is a graph showing a spectrally averaged trace obtained by averaging the OTDR traces while using chromatic dispersion correction. It illustrates how chromatic dispersion pulse broadening may be eliminated or at least significantly reduced.

Figure 6:
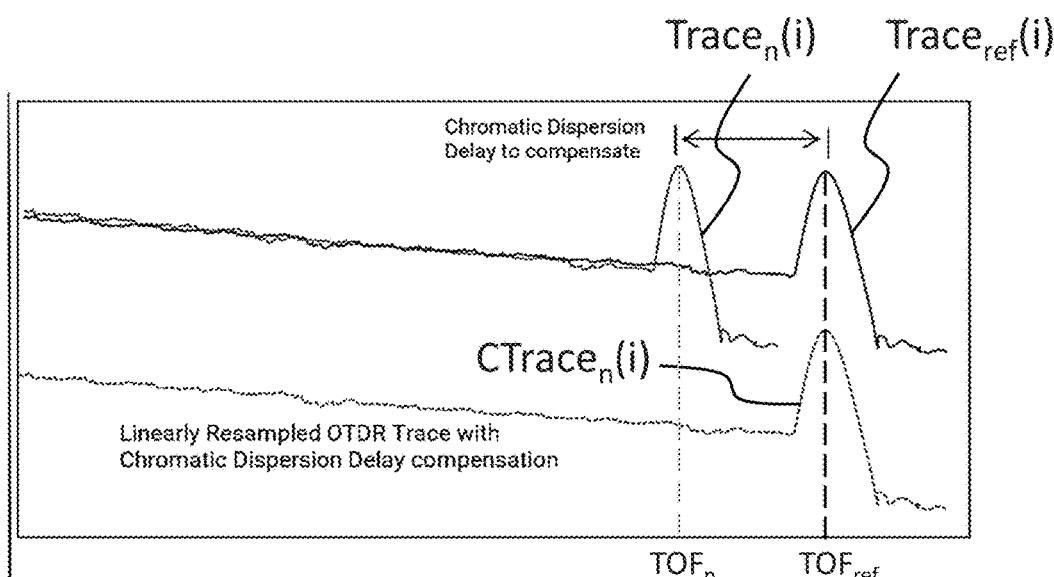
FIG. 6 is a graph illustrating a step of applying a chromatic dispersion correction to one OTDR trace $Trace_n(i)$ to produce a modified OTDR trace $CTrace_n(i)$.

An embodiment of a chromatic dispersion correction method is now described in more detail with reference to FIGS. 6 and 7.

In step 1, acquisition center wavelengths are defined. In one embodiment the center wavelengths may be determined from the available tuning range of the OTDR laser source, or a plurality of acquisition wavelengths may be selected over any bandwidth to be covered (which can be narrower than the whole tuning range of the source, if appropriate). For example, the tuning range may be divided into a number N of center wavelengths uniformly distributed over the tuning range. In some embodiments, for an optimal coverage of the tuning range, the laser linewidth Δλ corresponding to each OTDR acquisition may cover a fraction of the tuning range TR, such that:

$$TR = N^* \Delta\lambda \quad (4)$$

For example, for a laser linewidth Δλ of 0.1 nm, a 40-nm tuning range may be divided into 400 bands each having a 0.1-nm linewidth (the spacing between adjacent center wavelengths being approximately equal to the laser linewidth Δλ). In other embodiments, the spacing between the center wavelengths may be smaller or greater than the laser linewidth Δλ (such as half the linewidth for example).

Of course, in other embodiments, the acquisition center wavelengths may be hardcoded, or a wavelength grid may be input by a user, e.g., via a user interface.

In step 2, using a tunable OTDR acquisition device, OTDR acquisitions are performed toward the optical fiber link under test for each of the N center wavelengths to obtain a set of N OTDR traces ($Trace_n$), wherein n=1 to N.

Next, in order to determine the chromatic correction to be applied to each acquired OTDR trace ($Trace_n$), the method may either a) derive a peak position deviation from the acquired OTDR traces; or b) consider a known chromatic dispersion model of the fiber, e.g., using typical values known in the industry.

In one embodiment, the chromatic dispersion correction to be applied to each trace is derived from an event peak position ($PP_n$) obtained for each acquired OTDR trace ($Trace_n$), using data therefrom. Therefore, in optional step 3, a peak position ($PP_n$) is calculated for each acquired OTDR trace ($Trace_n$). The peak position ($PP_n$) is derived from a reflective event that can be distinguished on all the OTDR traces of the set. Depending on the specific calculations being applied, the peak position ($PP_n$) may be expressed on an index scale (i) of the OTDR data, a time scale, a distance scale or any other applicable scale.

More specifically, a processing unit is used to select a reflective event that can be distinguished on all OTDR traces of the set by detecting a clear peak which appears on all the acquired OTDR traces at the same approximate position, e.g., within an expected position difference Δx due to chromatic dispersion and an expected reasonable position measurement error. For better accuracy, it may be advantageous to select a reflective peak that is located farther along the optical fiber link, and which is, e.g., more than 5 dB above the backscattering or noise level. For example, the reflectance peak created by the end of the fiber may represent a good choice.

Figure 8:
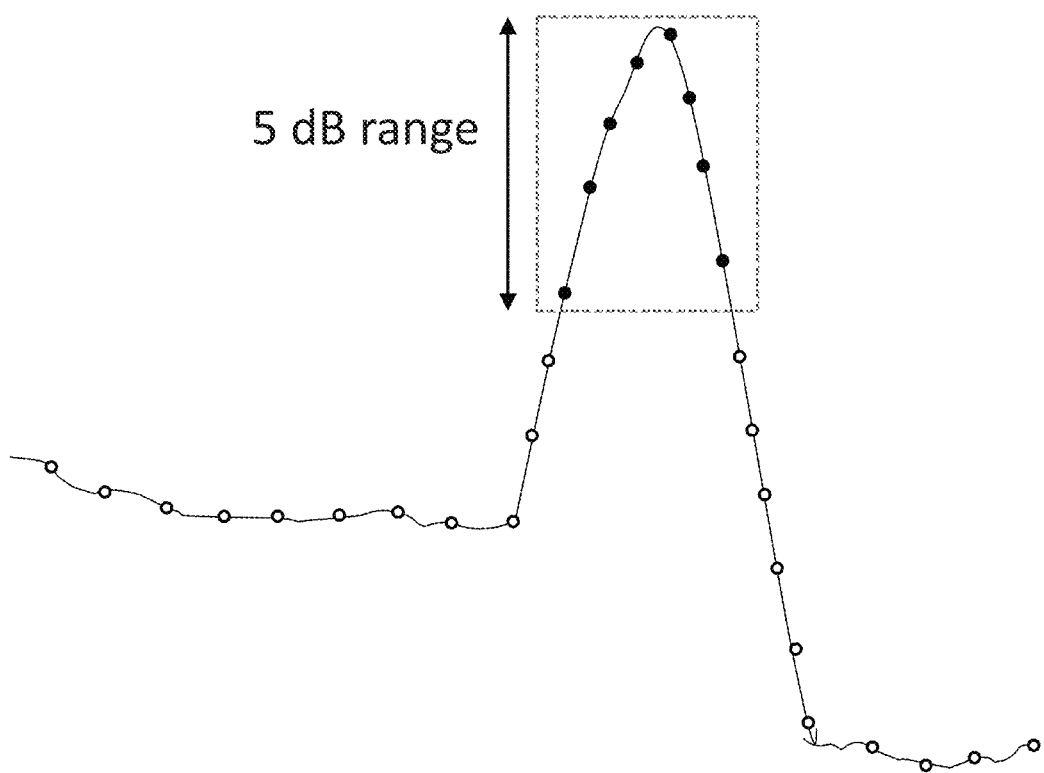
FIG. 8 is a graph illustrating the centroid calculation method for finding a peak position of an OTDR reflective event.

As illustrated in FIG. 8, for each OTDR trace (Trace$_n$), the processing unit may then calculate the centroid of the peak corresponding to the reference reflective event in the OTDR trace. For example, the centroid is may be calculated as follows using points within, e.g., the 5-dB bandwidth of the peak:

$$i_c = \frac{\sum Trace(i) \times i}{\sum Trace(i)} \quad (5)$$

wherein Trace(i) represents the OTDR trace data value at index i. The centroid is therefore corresponds to the value of the index along the OTDR trace corresponding to the peak position PP$_n$, i.e., where the peak is located (which value need not be an integer should the peak be located in-between two index positions). If need be, the peak position can also be expressed as the delay $\Delta t_c$ or TOF between the pulsed test signal and the detected return light, for the selected reflective event using the known sampling period $\Delta t$ of the OTDR: TOF=$i_c \times \Delta t$. It may also be expressed in distance:

$$D_c = c \times i_c \times \Delta t / (2 \times n_{eff}) \quad (6)$$

wherein $D_c$ is the distance along the tested optical fiber link, c is the light speed in vacuum ($3 \times 10^8$ m/s) and $n_{eff}$ is the optical fiber effective refractive index (1.4679).

In step 4, a chromatic dispersion correction is then applied on each OTDR trace (Trace$_n$) to produce modified OTDR traces (CTrace$_n$) which are rescaled so that positions of the reference reflective event match in all the modified OTDR traces (CTrace$_n$).

Although an OTDR trace is typically referred to as a function representing backscattered and reflected light as a function of "distance" in the optical fiber link under test, what is actually measured during an OTDR acquisition is the return light as a function of "time". OTDR data is therefore sampled on the time scale, with a fixed sampling period $\Delta t$ determined by the sampling circuit. If one would consider the chromatic dispersion in converting the acquisition data into OTDR data as a function of distance (i.e., on a distance scale), each of the plurality of OTDR traces (Trace$_n$(x)) would then have a distinct sampling period (in value of distance x). This would account for chromatic dispersion and would therefore eliminate chromatic dispersion pulse broadening. However, the sampling scale between each OTDR trace would then not match, making them unsuitable for averaging the OTDR traces.

This is the principle used herein for chromatic dispersion correction. The proposed technique is equivalent to converting the acquired data on a time scale into an OTDR trace on a distance scale, while taking the chromatic dispersion into account; and, before averaging the OTDR traces, resampling the OTDR traces toward a reference sampling scale.

In practice, the sampling scale of the acquired OTDR traces (Trace$_n$) may simply be stretched to correct for chromatic dispersion and the OTDR trace be resampled to a reference sampling scale before averaging. The stretching factor to be applied may be determined from the position (PP$_n$) of a selected reflective peak in the acquired OTDR trace (see step 3) or using a typical value of chromatic dispersion coefficient CD$_{coeff}$.

More specifically, in one embodiment using a position of a reflective peak to determine the chromatic correction to be applied, the method goes as follows:

A reference trace (Trace$_{ref}$) is established, which may correspond, e.g., to the OTDR trace which corresponds to the center of the bandwidth covered by the OTDR acquisitions. However, one will understand that the choice of the reference OTDR trace (Trace$_{ref}$) is arbitrary and that any other OTDR trace may be used as a reference.

A stretching factor is then computed for each OTDR trace (Trace$_n$). In one embodiment, the stretching factor is computed based on the corresponding peak positions PP$_n$ determined in step 3 and the peak position PP$_{ref}$ of the reference trace (Trace$_{ref}$):

$$StretchingFactor_n = PP_n / PP_{ref} \quad (7)$$

It should be noted that the stretching factor StretchingFactor$_n$ is unitless and may be applied directing on the sampled OTDR traces. The objective is then to scale the OTDR traces (Trace$_n$) to make the position of the reference reflective event to matches.

The stretching factor is then applied on the OTDR traces (Trace$_n$) by resampling the traces using a linear interpolation.

For example, the stretching factor may be applied as follows. For each index i of the OTDR trace to scale:

$$i_{scaled} = floor(i \ast StretchingFactor_n) \quad (8a)$$

$$C_{interpolation} = i \ast StretchingFactor_n - i_{scaled} \quad (8b)$$

$$CTrace_n(i) = Trace_n(i_{scaled}) \ast (1 - C_{interpolation}) + Trace_n(i_{scaled} + 1) \ast C_{interpolation} \quad (8c)$$

wherein C$_{interpolation}$ represents an interpolation value which is recalculated for each index i and the OTDR trace n.

The method is applied to each OTDR traces (Trace$_n$) to produce the modified OTDR traces (CTrace$_n$) in which positions of the reference reflective event match (i.e., fall on the same index i). It is noted that, by matching the reference reflective event, all other OTDR events along the optical fiber link under test should also match.

Figure 7:
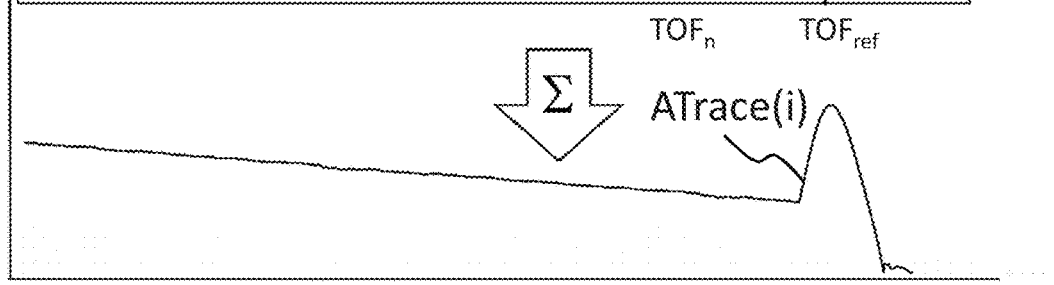
FIG. 7 is a graph showing a spectrally averaged OTDR trace resulting from the averaging of modified OTDR traces $CTrace_n(i)$ as shown in FIG. 6.

As illustrated in FIG. 7, in step 5, once the chromatic dispersion correction is applied on all acquired OTDR traces (Trace$_n$), the resampled traces CTrace$_n$ are averaged to obtain a spectrally averaged OTDR trace (ATrace). The hereby obtained spectrally averaged OTDR trace (ATrace) is aligned with the reference OTDR trace on the index scale.

Figure 9:
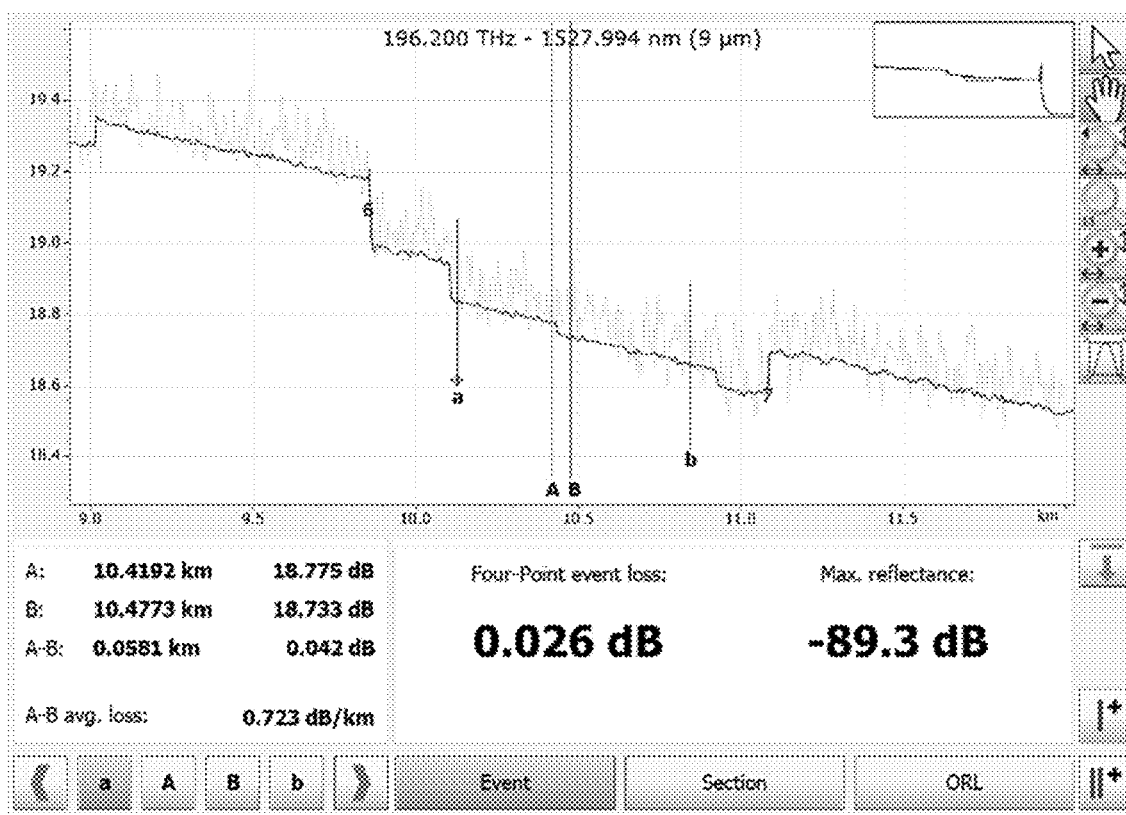
FIG. 9 is a graph illustrating an example application of the spectral averaging method described herein to the measurement of a very small splice, wherein the OTDR trace shown in grey is obtained without spectral averaging and the trace shown in black is obtained with spectral averaging and chromatic dispersion correction.
Figure 10:
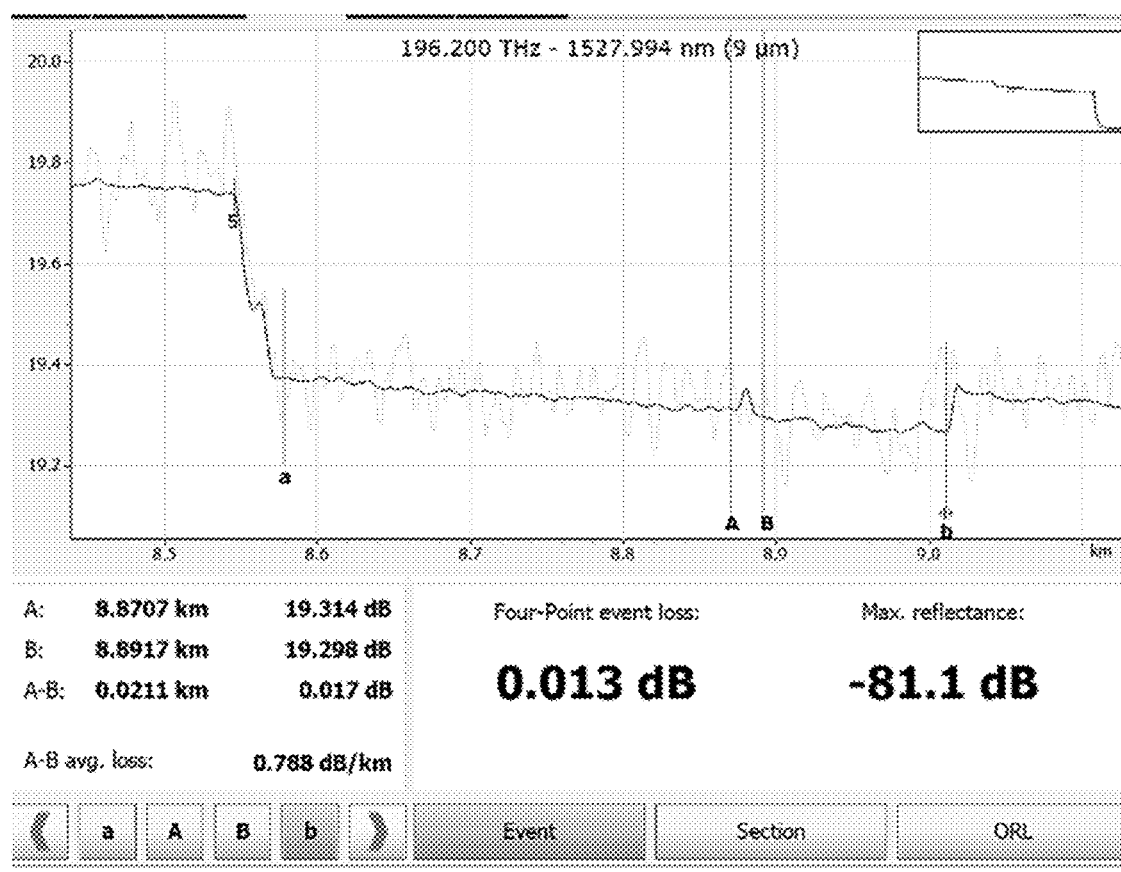
FIG. 10 is a graph illustrating another example application of the spectral averaging method described herein to the measurement of a reflective event, wherein the OTDR trace shown in grey is obtained without spectral averaging and the trace shown in black is obtained with spectral averaging and chromatic dispersion correction.

FIGS. 9 and 10 illustrate examples of possible OTDR trace quality improvement using this technique for an OTDR pulse width of 50 ns. The noisy traces (grey) are obtained without averaging and the cleaner traces (black) are obtained with spectral averaging and chromatic dispersion correction. FIG. 9 illustrates a very small splice measurement and FIG. 10 illustrates a reflective event. In these examples, the spectral averaging is performed over a tuning range of 40 nm, using a laser linewidth of 8 pm, but other tuning ranges and laser linewidths may be used as well. For example, in other embodiments, the tuning range may be selected between about 5 nm to 50 nm (depending on the level of speckle noise).

Another embodiment of step 4 is now described, which embodiment uses a typical value of chromatic dispersion to determine the chromatic correction to be applied. In this embodiment, step 3 may be omitted as a whole, and the stretching factor be calculated directly from typical values of chromatic dispersion obtained from the optical fiber specification, i.e., without calculating a time of flight TOF$_n$ or peak position PP$_n$ for each acquired OTDR trace (Trace$_n$).

This can be made possible assuming that the dispersion characteristics of the optical fiber under test are a priori known.

For example, assuming that the fiber under test is made of Corning® SMF-28e® optical fiber, then the dispersion value D at a given wavelength $\lambda_n$ of the OTDR laser may be obtained from the optical fiber specification provided by the manufacturer, i.e.:

$$D(\lambda_n) \approx \frac{S_0}{4}\left[\lambda_n - \frac{\lambda_0^4}{\lambda_n^3}\right] \text{ps/(nm·km)} \qquad (9)$$

$\lambda_0 = 1313$ nm $S_0 = 0.086$ ps/(nm² km)

wherein $S_0$ is the zero-dispersion slope and $\lambda_0$ is the zero-dispersion wavelength.

The stretching factor to be applied on each OTDR trace (Trace$_n$) in order to apply a chromatic dispersion correction may then be calculated as:

$$\text{StretchingFactor}_n = D(\lambda_n)/D(\lambda_{ref}) \qquad (10)$$

Steps 4 and 5 as described hereinabove may then be conducted using this stretching factor.

In yet another embodiment, the method may try to find a reflectance peak created by the end of the fiber in order to determine the chromatic dispersion correction to be applied on each OTDR trace (first method described hereinabove). But, if the reflectance peak does not comply with given criterion(s), e.g., the reflectance peak is too weak or not sufficiently far way along the optical fiber link to allow reliable chromatic dispersion correction, then the method uses a typical value of chromatic dispersion to determine the chromatic correction to be applied (second method described hereinabove).

The embodiments described above are intended to be exemplary only and one skilled in the art will recognize that numerous modifications can be made to these embodiments without departing from the scope of the invention.

For example, in one embodiment, instead of deriving a peak position PP$_n$ on the index scale (i$_c$), a time of flight TOF$_n$ corresponding to the peak may be derived for each acquired OTDR trace (Trace$_n$) expressed on a time scale. The stretching factor may also be determined from the peak position PP$_i$ of the reference reflective event for OTDR traces as expressed on a distance scale (x).

It is further noted that when applying step 3 to derive the stretching factor, the method may further be used to derive the actual chromatic dispersion of the optical fiber under test. The dispersion coefficient for each wavelength can be computed as follows.

Having computed the TOF$_n$ of each trace (Trace$_n$), the chromatic dispersion coefficient as a function of $\lambda$ (D($\lambda_n$)) can be computed as follows:

$$D(\lambda_n) = TOF_n[ps]/(2 \times D_c[km] \times \lambda_n[nm]) \qquad (11)$$

wherein $D_c$ is the distance along the tested optical fiber link where the reference reflective event is located and the factor 2 is used to account for the back-and-forth propagation in the optical fiber.

To reduce noise and improve measurement accuracy, a fit may be applied to values of D($\lambda_n$) using, e.g., a least square regression method to a dispersion model equation. As to the dispersion model equation, it varies as a function of the type of optical fiber under test (e.g., standard single mode, dispersion shifted, non-zero dispersion shifted, etc.). The dispersion model equation may then be selected according to the known type of optical fiber and wavelength range under test.

Figure 11:
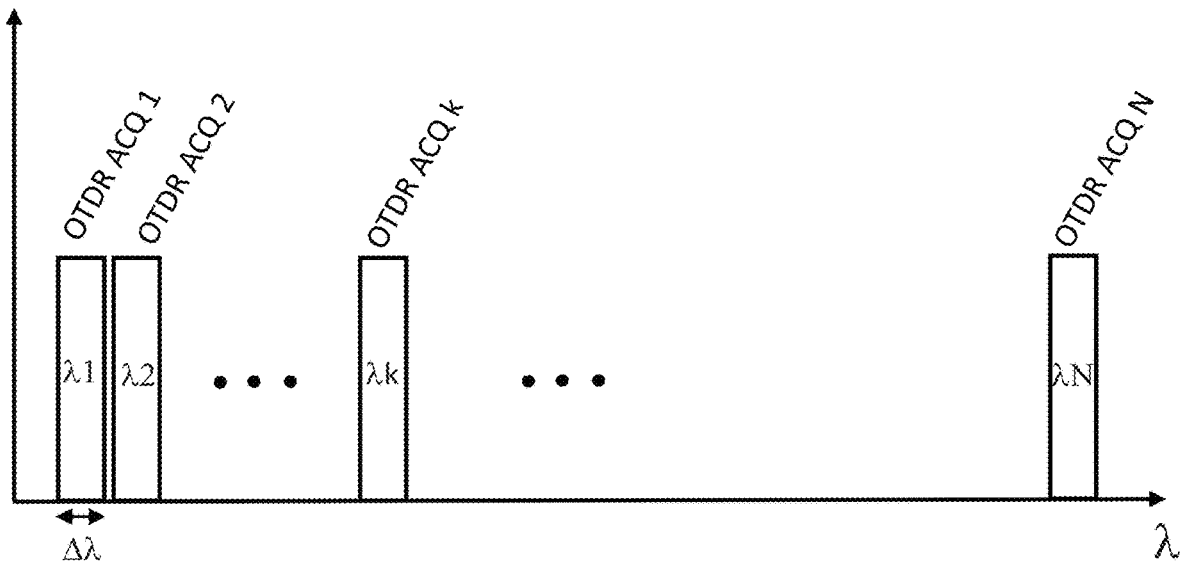
FIG. 11 is a graph illustrating a fixed wavelength grid method N wavelengths $\lambda_n$ used to cover a tuning range.
Figure 12:
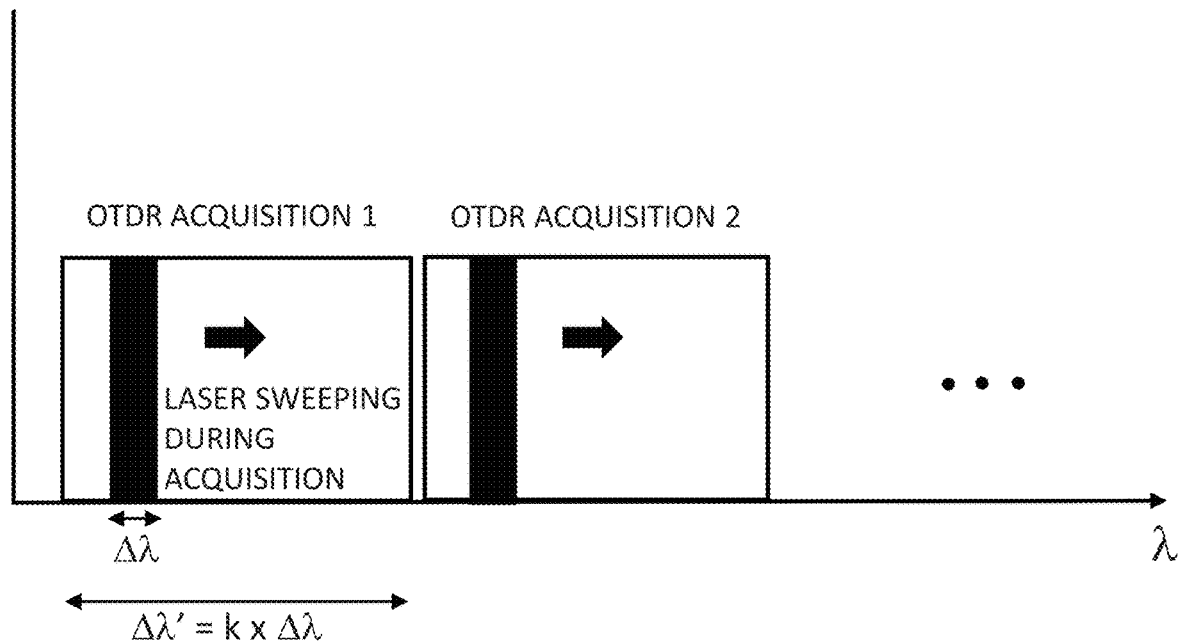
FIG. 12 is a graph illustrating wavelength sweep method used to cover a tuning range by performing OTDR acquisitions while the laser source is swept in wavelength over a subband $\Delta\lambda'$.

FIGS. 11 and 12 illustrate a further embodiment wherein OTDR acquisitions are performed while the OTDR laser source is swept in wavelength. More specifically, in the above-described embodiments, the OTDR laser source is presented as being tuned in steps between each OTDR acquisitions, such that each OTDR trace is acquired at a fixed wavelength $\lambda_n$. FIG. 11 illustrates such an example wherein N fixed wavelengths $\lambda_n$ are used to cover a tuning range TR=N×Δλ, wherein Δλ is the laser linewidth. However, it should be noted that, in other embodiments as illustrated in FIG. 12, OTDR acquisitions may be performed while the OTDR laser source is swept in wavelength, so that each OTDR acquisition covers a subband Δλ' of the whole bandwidth TR to be covered. A group of k OTDR acquisitions is then replaced by sweeping the laser source over the wavelength range corresponding to the k OTDR acquisitions. This scheme can be useful, e.g., in the case of an OTDR laser source having a narrow linewidth Δλ, such as (e.g., 0.1 nm). In such case, covering a broad bandwidth of (e.g., 40 nm) using step by step tuning would require a large number (e.g., 400) of OTDR acquisitions (and hence a long time). Sweeping the OTDR laser source over a subband Δλ' of 2 nm would allow to cover the whole bandwidth using only 20 different OTDR acquisitions instead of 400 acquisitions, which speeds up the acquisition time in the same proportion.

The center wavelength $\lambda_n$ of each OTDR acquisition (Trace$_n$) then corresponding to the center of the subband Δλ'.

In order to maintain the advantages of the chromatic dispersion correction, the sweeping range Δλ' of the subbands should not be made too large. One should therefore consider the chromatic dispersion (and hence the pulse broadening) induced within one subband Δλ'.

Using equation (3), the expected pulse broadening Δx may be calculated. For example, considering a distance D of 50 km, a sweeping range Δλ' of 2 nm generates a pulse broadening of Δx 0.37 m, which is considered acceptable for an OTDR pulse length of, e.g., 1 meter (10 ns).

Example of OTDR Device Architecture

Figure 13:
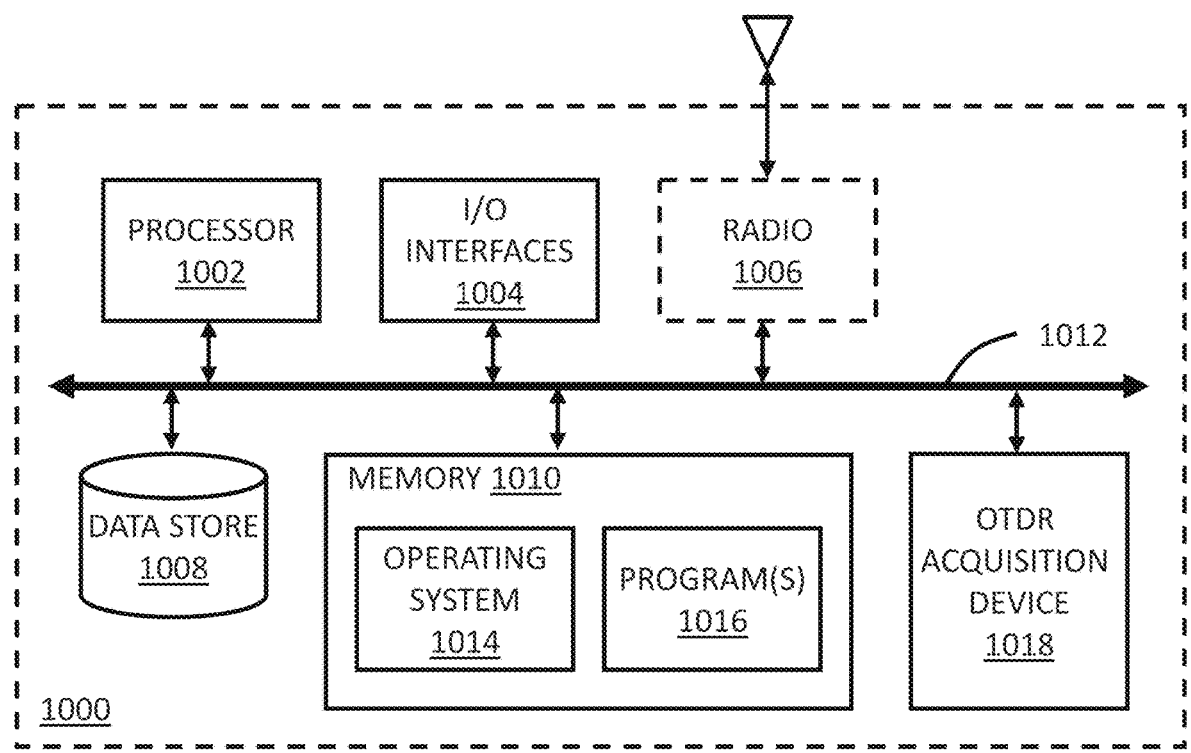
FIG. 13 is a block diagram illustrating an example architecture of an OTDR device used to implement a spectral averaging method as described herein, in accordance with one embodiment.

Much of the techniques and methods described herein may be implemented in an OTDR device 1000 such as that illustrated in FIG. 13. The OTDR device 1000 may comprise a digital device that, in terms of hardware architecture, generally includes a processor 1002, input/output (I/O) interfaces 1004, an optional radio 1006, a data store 1008, a memory 1010, as well as an optical test device including an OTDR acquisition device 1018. It should be appreciated by those of ordinary skill in the art that FIG. 13 depicts the OTDR device 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the OTDR device 1000 is in operation, the processor 1002 is configured to execute software stored within the memory 1010, to communicate data to and from the memory 1010, and to generally control operations of the OTDR device 1000 pursuant to the software instructions. In an embodiment, the processor 1002 may include an optimized mobile processor such as optimized for power consumption and mobile applications. The I/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The I/O interfaces 1004 can be used to display a graphical user interface (GUI) that enables a user to interact with the OTDR device 1000 and/or output at least one of the values derived by the OTDR analyzing module.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication. The data store 1008 may be used to store data, such as OTDR traces and OTDR measurement data files. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 13, the software in the memory 1010 includes a suitable operating system (O/S) 1014 and computer programs 1016. The operating system 1014 essentially controls the execution of other computer programs and provides scheduling, input-output control, file and data management, memory management, and communication control and related services. The program(s) 1016 may include various applications, add-ons, etc. configured to provide end-user functionality with the OTDR device 1000. For example, example programs 1016 may include a web browser to connect with a server for transferring OTDR measurement data files, a dedicated OTDR application configured to control OTDR acquisitions by the OTDR acquisition device 1018, set OTDR acquisition parameters, analyze OTDR traces obtained by the OTDR acquisition device 1018 and display a GUI related to the OTDR device 1000. For example, the dedicated OTDR application may embody an OTDR analysis module configured to analyze acquired OTDR traces in order to characterize the optical fiber link under test, and produce OTDR measurement data files. The dedicated OTDR application may embody a spectral averaging module configured to average OTDR traces acquired with different central wavelengths while at least partly cancelling chromatic dispersion pulse broadening on the averaged OTDR trace by applying a chromatic dispersion correction process as described herein.

It is noted that, in some embodiments, the I/O interfaces 1004 may be provided via a physically distinct mobile device (not shown), such as a handheld computer, a smartphone, a tablet computer, a laptop computer, a wearable computer or the like, e.g., communicatively coupled to the OTDR device 1000 via the radio 106. In such cases, at least some of the programs 1016 may be located in a memory of such a mobile device, for execution by a processor of the physically distinct device. The mobile may then also include a radio and be used to transfer OTDR measurement data files toward a remote test application residing, e.g., on a server.

It should be noted that the OTDR device shown in FIG. 13 is meant as an illustrative example only. Numerous types of computer systems are available and can be used to implement the OTDR device.

Example of OTDR Acquisition Device Architecture

Figure 14:
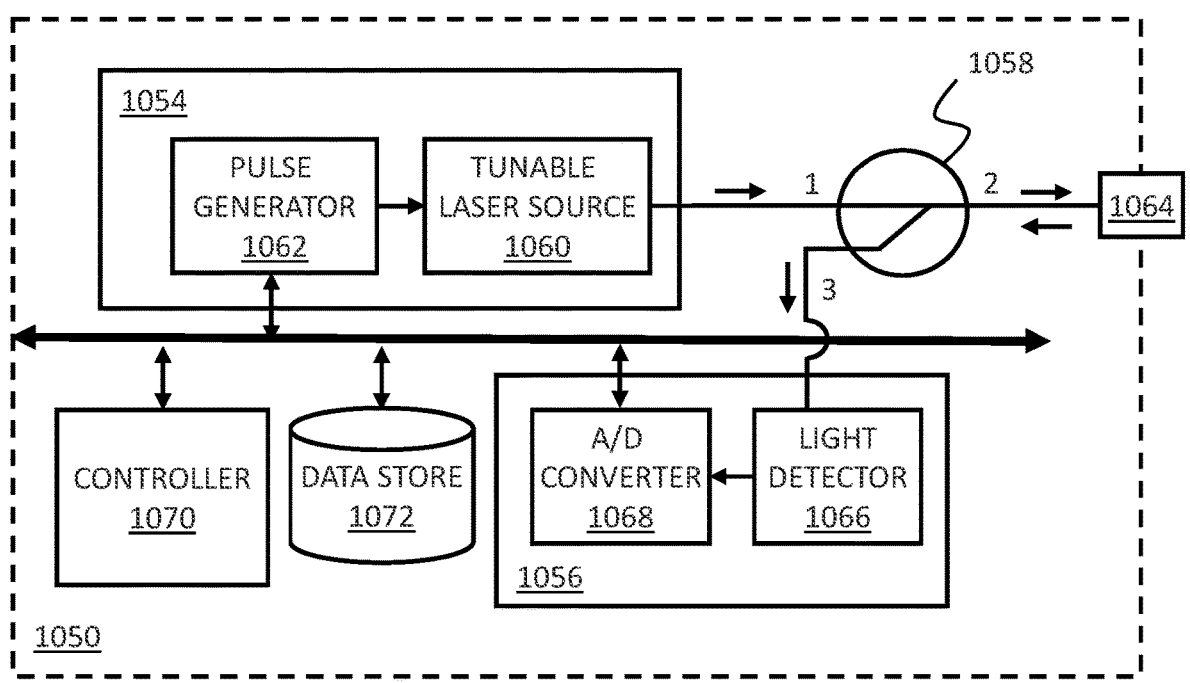
FIG. 14 is a block diagram illustrating an example architecture of an OTDR acquisition device of the OTDR device of FIG. 13.

FIG. 14 is a block diagram an embodiment of an OTDR acquisition device 1050 which may embody the OTDR acquisition device 1018 of the OTDR device 1000 of FIG. 13.

The OTDR acquisition device 1050 is connectable toward the tested optical fiber link via an output interface 1064, for performing OTDR acquisitions toward the optical fiber link. The OTDR acquisition device 1050 comprises conventional optical hardware and electronics as known in the art for performing OTDR acquisitions over an optical fiber link.

The OTDR acquisition device 1050 comprises a light generating assembly 1054, a detection assembly 1056, a directional coupler 1058, as well as a controller 1070 and a data store 1072.

The light generating assembly 1054 is embodied by a tunable laser source 1060 driven by a pulse generator 1062 to generate the OTDR test signal comprising test light pulses having desired characteristics. As known in the art, the light generating assembly 1054 is adapted to generate test light pulses of varied pulse widths, repetition periods and optical power through a proper control of the pattern produced by the pulse generator 1062. It will be understood that the light generating assembly 1054 may combine both pulse width and wavelength control capabilities. Of course, different and/or additional components may be provided in the light generating assembly, such as modulators, lenses, mirrors, optical filters, wavelength selectors and the like.

The light generating assembly 1054 is coupled to the output interface 1064 of the OTDR acquisition device 1050 through a directional coupler 1058, such as a circulator, having three or more ports. The first port is connected to the light generating assembly 1054 to receive the test light pulses therefrom. The second port is connected toward the output interface 1064. The third port is connected to the detection assembly 1056. The connections are such that test light pulses generated by the light generating assembly 1054 are coupled to the output interface 1064 and that the return light signal arising from backscattering and reflections along the optical fiber link 110 is coupled to the detection assembly 1056.

The detection assembly 1056 comprises a light detector 1066, such as a photodiode, an avalanche photodiode or any other suitable photodetector, which detects the return light signal corresponding to each test light pulse, and an analog to digital converter 1068 to convert the electrical signal proportional to the detected return light signal from analog to digital in order to allow data storage and processing. It will be understood that the detected return light signal may of course be amplified, filtered or otherwise processed before analog to digital conversion. The power level of return light signal as a function of time, which is obtained from the detection and conversion above, is referred to as one acquisition of an OTDR trace. One skilled in the art will readily understand that in the context of OTDR methods and systems, each light acquisition generally involves propagating a large number of substantially identical light pulses in the optical fiber link and averaging the results, in order to improve the Signal-to-Noise Ratio (SNR). In this case, the result obtained from averaging is herein referred to as an OTDR trace.

Of course, the OTDR acquisition device 1050 may also be used to perform multiple acquisitions with varied pulse widths to obtain a multi-pulsewidth OTDR measurement.

The OTDR acquisition device 1050, and more specifically the light generating assembly 1054 is controlled by the controller 1070. The controller 1070 is a hardware logic device. It may comprise one or more Field Programmable Gate Array (FPGA); one or more Application Specific Integrated Circuits (ASICs) or one or more processors, configured with a logic state machine or stored program instructions. When the OTDR acquisition device 1050 is in operation, the controller 1070 is configured to control the OTDR measurement process. The controller 1070 controls parameters of the light generating assembly 1054 according to OTDR acquisition parameters that are either provided by the operator of the OTDR software or otherwise determined by program(s) 1016.

The data store 1072 may be used to cumulate raw data received from the detection assembly 1056, as well as intermediary averaged results and resulting OTDR traces. The data store 1008 may include any of volatile memory elements (e.g., random access memory (RAM, such as DRAM, SRAM, SDRAM, and the like)) or the like and it may be embedded with the controller 1070 or distinct.

The OTDR traces acquired by the OTDR acquisition device 1050 may be received and analyzed by one or more of the computer programs 1016 and/or stored in data store 1008 for further processing.

It should be noted that the architecture of the OTDR acquisition device 1050 as shown in FIG. 14 is meant as an illustrative example only. Numerous types of optical and electronic components are available and can be used to implement the OTDR acquisition device.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

There are a broad range of applications of this spectral averaging technique including:
Fiber link characterization in the context of fiber monitoring
Very small events detection: very small reflectance and splice detection
High accuracy bidirectional measurement
High accuracy and shorter fiber attenuation measurements
Accurate measurements of short splices in a production floor environment: short pulses and low speckle noise
Chromatic dispersion measurement may be an outcome of the measurements process
Fiber attenuation profile may also be another possible outcome The embodiments described above are intended to be exemplary only. The scope of the invention is therefore intended to be limited solely by the appended claims.

The invention claimed is:

1. A method for characterizing an optical fiber link under test, the method comprising:
performing a plurality of OTDR acquisitions toward the optical fiber link under test,
wherein each OTDR acquisition is performed by propagating a pulsed test signal in the optical fiber link under test and detecting corresponding return light from the optical fiber link so as to obtain an OTDR trace representative of backscattered and reflected light as a function of distance in the optical fiber link under test, and wherein said plurality of OTDR acquisitions are performed with mutually-different center wavelengths of said pulsed test signal;

applying a chromatic dispersion correction on each of the plurality of OTDR traces to produce modified OTDR traces; and averaging said modified OTDR traces to obtain a spectrally averaged OTDR trace.

2. The method as claimed in claim 1, wherein center wavelengths of said plurality of OTDR acquisitions are uniformly distributed over a bandwidth to be covered.

3. The method as claimed in claim 1, wherein center wavelengths of said plurality of OTDR acquisitions are uniformly distributed over a tuning range of said pulsed test signal.

4. The method as claimed in claim 1, wherein a spacing between said center wavelengths is approximately equal to a linewidth of said pulsed test signal.

5. The method as claimed in claim 1, further comprising: for each obtained OTDR trace, calculating a peak position associated with a reflective peak that is found to be present on each obtained OTDR trace.

6. The method as claimed in claim 1, wherein said applying a chromatic dispersion correction comprises: for each of said plurality of OTDR traces,
calculating a stretching factor to be applied on a sampling scale of the OTDR trace, to account for chromatic dispersion; and
resampling the OTDR trace to a reference sampling scale according to the stretching factor to provide a modified OTDR trace.

7. The method as claimed in claim 6, wherein, for each OTDR trace, the stretching factor is determined from a position of a selected reflective peak in the acquired OTDR trace and in a reference OTDR trace.

8. The method as claimed in claim 6, wherein, for each OTDR trace, the stretching factor is determined based on a center wavelength associated with the OTDR trace and with a reference OTDR trace, and values of chromatic dispersion corresponding to said center wavelengths.

9. The method as claimed in claim 1, wherein, each of said plurality of OTDR acquisitions is performed while the pulsed test signal is swept in wavelength, the center wavelength of each OTDR acquisition corresponding to a center of a subband swept in wavelength.

10. The method as claimed in claim 1, wherein, each of said plurality of OTDR acquisitions is performed while the pulsed test signal is fixed in wavelength.

11. An OTDR system for characterizing an optical fiber link under test, the OTDR system comprising:
a tunable OTDR acquisition device connectable toward an end of the optical fiber link under test for performing a plurality of OTDR acquisitions toward the optical fiber link,
wherein each OTDR acquisition is performed by propagating a pulsed test signal in the optical fiber link under test and detecting corresponding return light from the optical fiber link so as to obtain an OTDR trace representative of backscattered and reflected light as a function of distance in the optical fiber link under test; and
wherein OTDR acquisition device comprises a laser source tunable to perform said plurality of OTDR acquisitions with mutually-different center wavelengths of said pulsed test signal;
a processing unit connected to the tunable OTDR acquisition device to receive the OTDR traces and configured for:
processing each of said plurality of OTDR acquisitions by applying a chromatic dispersion correction to produce corrected OTDR acquisitions; and
averaging said corrected OTDR acquisitions to obtain a spectral averaged OTDR trace.

12. The OTDR system as claimed in claim 11, wherein center wavelengths of said plurality of OTDR acquisitions are uniformly distributed over a bandwidth to be covered.

13. The OTDR system as claimed in claim 11, wherein center wavelengths of said plurality of OTDR acquisitions are uniformly distributed over a tuning range of said pulsed test signal.

14. The OTDR system as claimed in claim 11, wherein a spacing between said center wavelengths is approximately equal to a linewidth of said pulsed test signal.

15. The OTDR system as claimed in claim 11, wherein the processing unit is further configured for: for each obtained OTDR trace, calculating a peak position associated with a reflective peak that is found to be present on each obtained OTDR trace.

16. The OTDR system as claimed in claim 11, wherein said applying a chromatic dispersion correction comprises: for each of said plurality of OTDR traces,
calculating a stretching factor to be applied on a sampling scale of the OTDR trace, to account for chromatic dispersion; and
resampling the OTDR trace to a reference sampling scale according to the stretching factor to provide a modified OTDR trace.

17. The OTDR system as claimed in claim 16, wherein, for each OTDR trace, the stretching factor is determined from a position of a selected reflective peak in the acquired OTDR trace and in a reference OTDR trace.

18. The OTDR system as claimed in claim 16, wherein, for each OTDR trace, the stretching factor is determined based on a center wavelength associated with the OTDR trace and with a reference OTDR trace, and values of chromatic dispersion corresponding to said center wavelengths.

19. The OTDR system as claimed in claim 11, wherein, each of said plurality of OTDR acquisitions is performed while the pulsed test signal is swept in wavelength, the center wavelength of each OTDR acquisition corresponding to a center of a subband swept in wavelength.

20. The OTDR system as claimed in claim 11, wherein, each of said plurality of OTDR acquisitions is performed while the pulsed test signal is fixed in wavelength.

21. A non-transitory computer-readable storage medium comprising instructions that, when executed, cause a processor to perform the steps of:
receiving a plurality of OTDR acquisitions performed toward an optical fiber link under test,
wherein each OTDR acquisition is performed by propagating a pulsed test signal in the optical fiber link under test and detecting corresponding return light from the optical fiber link so as to obtain an OTDR trace representative of backscattered and reflected light as a function of distance in the optical fiber link under test, and
wherein said plurality of OTDR acquisitions are performed with mutually-different center wavelengths of said pulsed test signal;

applying a chromatic dispersion correction on each of the plurality of OTDR traces to produce modified OTDR traces; and averaging said modified OTDR traces to obtain a spectrally averaged OTDR trace.

* * * * *